Dec. 12, 1950 J. R. OISHEI 2,533,613
SECONDARY ACCESSORY MOTOR UTILIZED AS SUCTION
STORAGE TANK FOR WINDSHIELD WIPERS
Filed Feb. 26, 1949
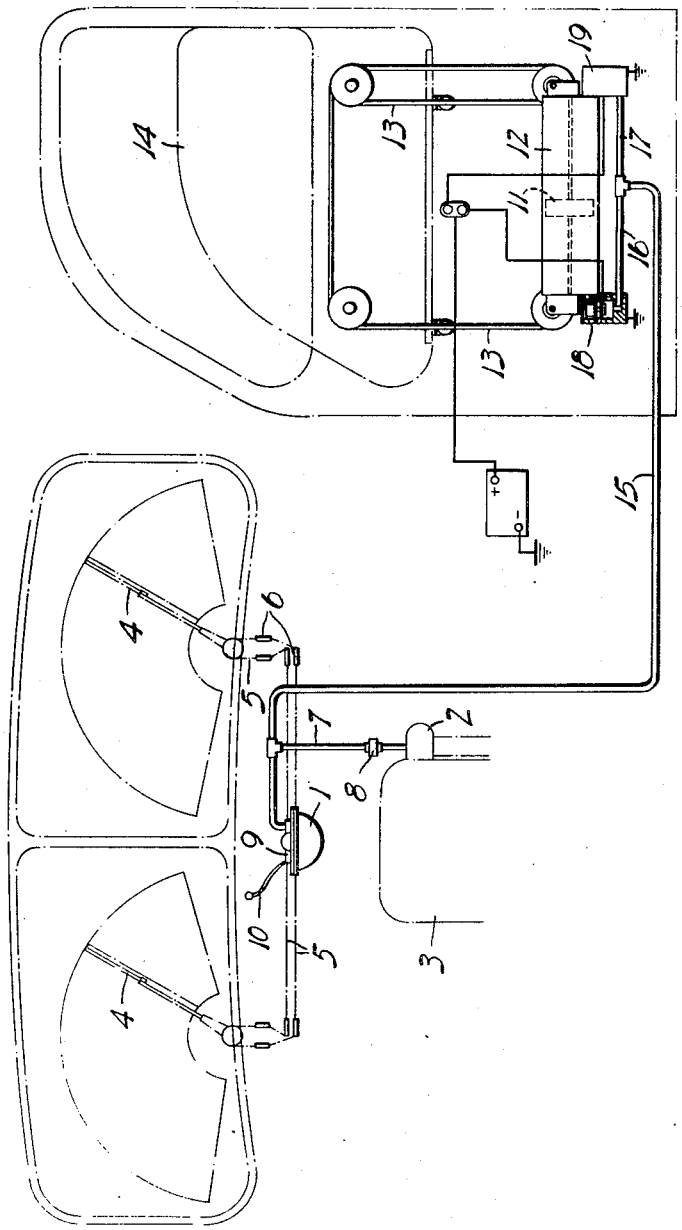
INVENTOR
John R. Oishei
BY
Bean, Brooks Buckley & Bean
ATTORNEYS Patented Dec. 12, 1950

2,533,613

UNITED STATES PATENT OFFICE 2,533,613

SECONDARY ACCESSORY MOTOR UTILIZED AS SUCTION STORAGE TANK FOR WINDSHIELD WIPERS

John R. Oishei, Buffalo, N. Y., assignor to Trico Products Corporation, Buffalo, N. Y.

Application February 26, 1949, Serial No. 78,563

2 Claims. (Cl. 60—60)

This invention relates to an accessory system for motor vehicles and especially to one which is operable by suction or negative pressure such as might be derived from the intake manifold of the vehicle power plant as a source.

The windshield cleaner which has proved so practical in the past sometimes responds to the fluctuations in the manifold suction influence, such as when the engine is laboring under a wide open throttle and therefore the retarded action of the windshield wiper is noticeable and sometimes annoying to the motorist.

Attempts have been made to tide the windshield cleaner operation over such intervals of meager pressure supply by providing low pressure storage tanks which not only entails further expense in the equipment but also locates the pressure reserve at a considerable distance from the accessory which tends toward a slow response.

The primary object of the present invention is to provide an accessory system which is economical as well as practical and one in which the accessory operation, such as the windshield cleaner, is maintained efficient.

A further object of the invention is to provide an accessory system embodying plural accessories so related that one accessory will constitute and serve as a pressure reserve for continuing the efficient operation of a companion accessory during intervals of low manifold suction influence.

The foregoing and other objects will manifest themselves as the following description progresses, reference being made to the accompanying drawing in which the illustration is a diagrammatic layout of an accessory system embodying the present invention.

Referring more particularly to the drawing, the numeral 1 designates a windshield cleaner motor of the fluid pressure type, 2 the intake manifold of the vehicle engine 3, and 4 the wipers operatively connected to the motor 1 by power transmitting cables 5 taking over pulleys 6. A conduit 7 connects the motor 1 to the manifold 2 as a source of operating pressure and in this conduit is inserted a check valve 8 closing against fluid flow from the manifold. A control valve 9, operable from a remote point by a push-pull wire 10, determines the operation of the windshield cleaner.

A second accessory motor, herein depicted as a window regulator, has a piston 11 movable back and forth in a chamber 12 and in the illustrated embodiment is connected by a power transmitting cable 13 to a vertically slidable window 14. The motor chamber 12 is connected by a conduit 15 to the conduit 7 between the windshield cleaner motor 1 and check valve 8, the latter being adapted to close when the suction influence in the manifold is less than that in the interconnected motors for serving the vacuous condition then prevailing in the accessory system. The conduit 15 has branch passages 16 and 17 connected to the motor chamber 12 at opposite sides of the piston through solenoidal valves 18 and 19 which latter are normally open to the suction line 7, 15 but are selectively operable to interrupt the suction communication at either side and to open such interrupted side to the atmosphere to secure the desired pressure differential for actuating the piston 11.

The capacity of the accessory chamber 12 is many times larger than that of the relatively smaller motor 1. The two motors therefore constitute an accessory system complete in itself for emergencies, the larger motor chamber serving in the capacity of a reservoir that is capable of holding a negative pressure sufficient to maintain proper wiper operation during intervals when the intake manifold suction is at low ebb, such as when the engine is momentarily laboring or its throttle wide open. The accessory system is closed off by the check valve 8 from the manifold as the primary source of pressure, the chamber 12 constituting a secondary source for the windshield cleaner and being replenished by the manifold when its suction predominates. By having the windshield cleaner motor normally open to the motor chamber 12, at both sides of the piston 11, the full capacity of the motor chamber is available for windshield cleaner operation regardless of the position of the piston. The storage capacity for the low pressure or suction may be increased by interconnecting the passage 15 to the motors of other window regulators for the remaining windows of the vehicle.

The foregoing description has been given in detail for clarity and not by way of limitation since the inventive principles involved are capable of assuming other physical embodiments without departing from the spirit of the invention and the scope of the appended claims.

What is claimed is:

1. A motor vehicle accessory system operable from the intake manifold of the power plant for the vehicle, comprising a suction actuated accessory having a fluid motor chamber connected to such intake manifold by a suction line, a control valve in the suction line for controlling the accessory operation, a second suction actuated accessory having a relatively larger motor chamber in open communication with the suction line and a reciprocable piston in the larger motor chamber movable toward one end thereof for providing a chamber portion of relatively greater capacity at the opposite side of the piston, such chamber portion being in such open communication with the suction line to serve as a suction storage space for supplying the first accessory with operating suction when the second accessory is inoperative, a control valve for the second accessory operable to actuate and arrest the latter, and a check valve interposed in the suction line between the intake manifold and the accessories to close them off from the manifold when the manifold influence is less than that in the interconnected chambers.

2. A motor vehicle accessory system operable from the intake manifold of the power plant for the vehicle, comprising a suction actuated windshield cleaner having a control valve, a suction line for connecting the control valve to such intake manifold, a suction actuated accessory having a relatively larger motor chamber with a piston therein movable back and forth, control valve means normally opening the opposite ends of the motor chamber to each other, an open conduit connecting the motor chamber to the suction line by which the windshield cleaner is enabled to utilize the motor chamber as a suction storage chamber when the accessory is inoperative, said valve means operable to interrupt the communication at either end of the chamber and to open such selected end to the atmosphere for effecting an operative pressure differential on the piston for the operation of the accessory, and means arranged in the suction line at the manifold side of the point where the conduit joins thereto for automatically closing the communication with the manifold when the degree of suction in the motor chamber dominates that in the manifold to constitute the motor chamber as the sole source of suction for the windshield cleaner during the period of such domination.

JOHN R. OISHEI.

REFERENCES CITED

The following references are of record in the file of this patent:

UNITED STATES PATENTS

| Number | Name | Date |
|---|---|---|
| 1,738,545 | Weber | Dec. 10, 1929 |
| 1,846,022 | Bragg et al. | Feb. 23, 1932 |
| 2,059,481 | Oishei et al. | Nov. 3, 1936 |
| 2,457,236 | Hokett | Dec. 28, 1948 |
| 2,457,834 | Ricketson | Jan. 4, 1949 |